(12) United States Patent
Oh et al.

(10) Patent No.: US 11,749,800 B2
(45) Date of Patent: Sep. 5, 2023

(54) HIGH PERFORMANCE STRETCHABLE ELECTRODE WITH FULL AREA COVERAGE AND METHOD FOR MANUFACTURING THE SAME

(71) Applicant: Korea University Research and Business Foundation, Seoul (KR)

(72) Inventors: Soong Ju Oh, Seoul (KR); Jun Sung Bang, Goyang-si (KR); Jun Hyuk Ahn, Seoul (KR); Yong Min Lee, Seoul (KR); Sang Yeop Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 205 days.

(21) Appl. No.: 17/488,578

(22) Filed: Sep. 29, 2021

(65) Prior Publication Data

US 2022/0115161 A1 Apr. 14, 2022

(30) Foreign Application Priority Data

Oct. 13, 2020 (KR) .......................... 10-2020-0132113

(51) Int. Cl.
| | |
|---|---|
| *H01B 1/22* | (2006.01) |
| *H01B 5/14* | (2006.01) |
| *H01M 4/36* | (2006.01) |
| *H01M 4/38* | (2006.01) |
| *H01B 5/16* | (2006.01) |
| *H01B 13/00* | (2006.01) |
| *H01B 13/008* | (2006.01) |

(52) U.S. Cl.
CPC .............. *H01M 4/366* (2013.01); *H01B 1/22* (2013.01); *H01B 5/14* (2013.01); *H01B 5/16* (2013.01); *H01B 13/008* (2013.01); *H01B 13/0013* (2013.01); *H01M 4/38* (2013.01)

(58) Field of Classification Search
CPC ... H01B 1/22; H01B 5/14; H01B 5/16; H01B 13/0013
See application file for complete search history.

(56) References Cited

U.S. PATENT DOCUMENTS

2010/0129261 A1 * 5/2010 Kim ................. G01N 33/54373
977/959

FOREIGN PATENT DOCUMENTS

| CN | 110455443 A | * 11/2019 | ............. B82Y 30/00 |
| CN | 110511418 A | * 11/2019 | ................ C08J 5/18 |

(Continued)

OTHER PUBLICATIONS

Korean Office Action dated Jun. 20, 2022, in counterpart Korean Patent Application No. 10-2020-0132113 (4 Pages in Korean).

(Continued)

*Primary Examiner* — Khanh T Nguyen
(74) *Attorney, Agent, or Firm* — NSIP Law

(57) ABSTRACT

Disclosed are a high performance stretchable electrode having a double layer structure with flexibility and high coverage, as well as a manufacturing method thereof. The stretchable electrode of the present invention has excellent performance based on high coverage. Therefore, the present invention may provide a high performance stretchable electrode with high conductivity and low gauge factor by selectively adjusting flexibility of the electrode.

10 Claims, 10 Drawing Sheets

(56) References Cited

FOREIGN PATENT DOCUMENTS

KR  10-2018-0056060 A  5/2018
KR  10-2019-0061661 A  6/2019

OTHER PUBLICATIONS

Lacour, Stéphanie Périchon, et al., "Stretchable Gold Conductors on Elastomeric Substrates," *Applied physics letters*, 82, 15, 2003 (pp. 2404-2406).

Lee, Jaehwan, et al., "A Stretchable Strain Sensor Based on a Metal Nanoparticle Thin Film for Human Motion Detection," *Nanoscale*, 6, 20, 2014 (pp. 11932-11939).

\* cited by examiner

[FIG. 1]
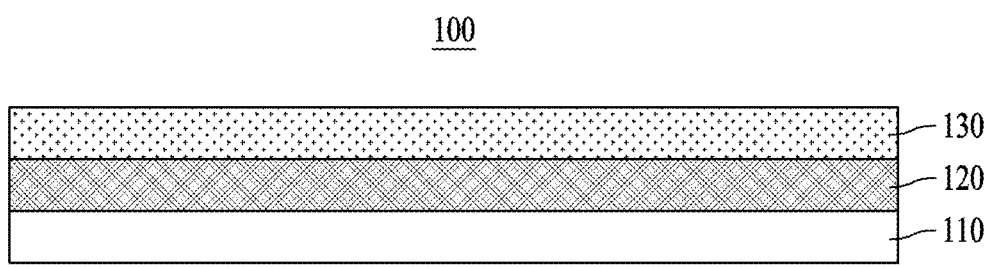
[FIG. 2]
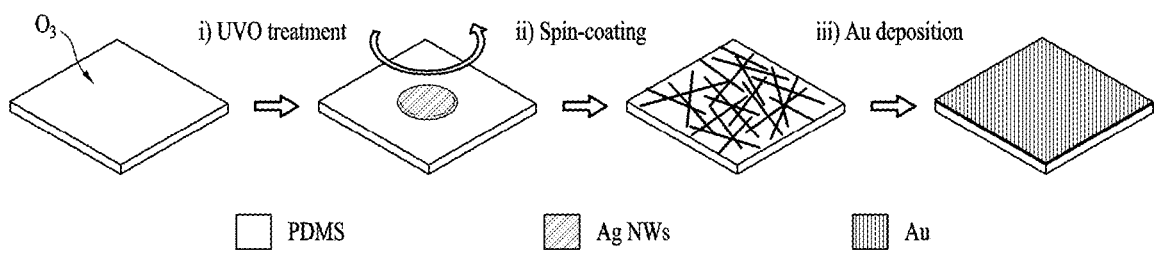

[ FIG. 3A ]
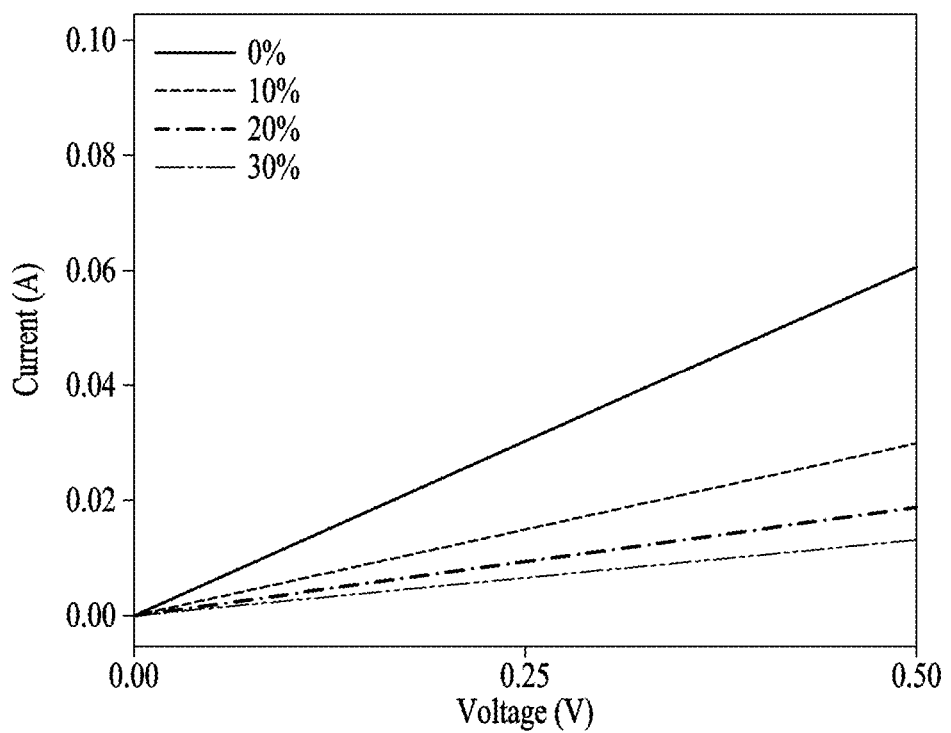

[FIG. 3B]
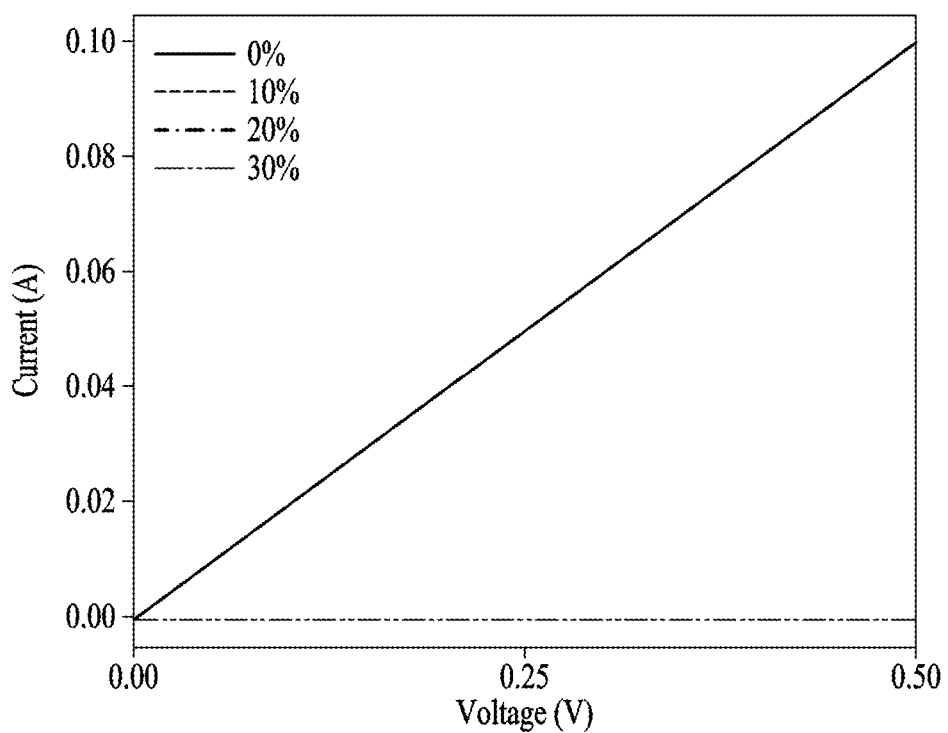

[FIG. 4]
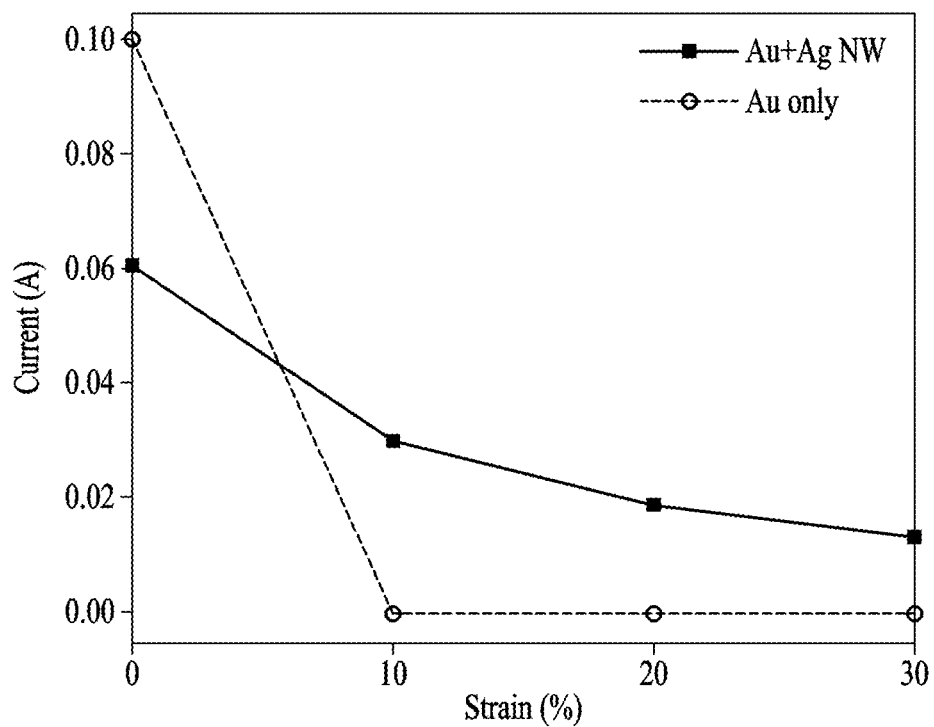
[FIG. 5]
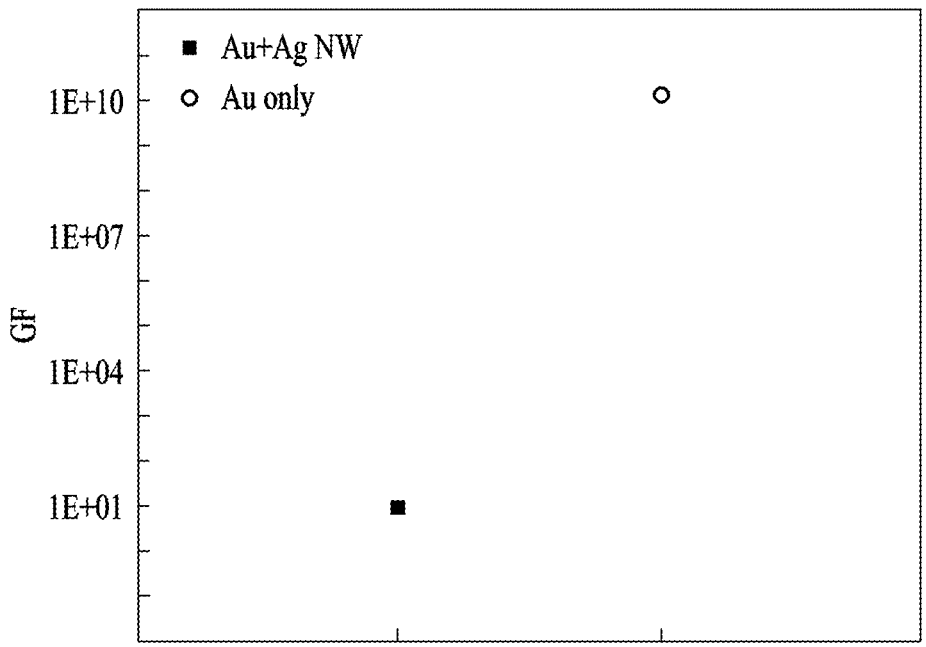

[ FIG. 6A ]
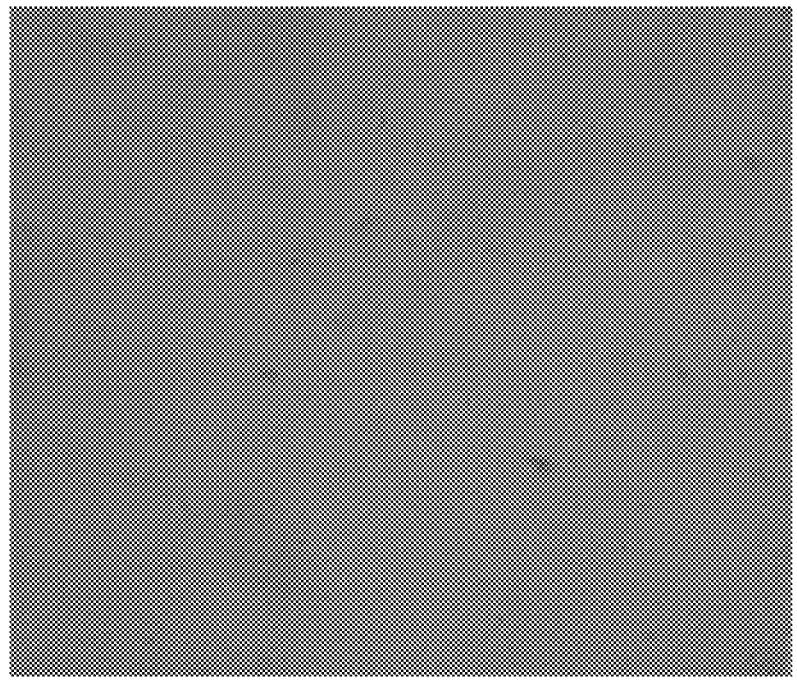
[ FIG. 6B ]
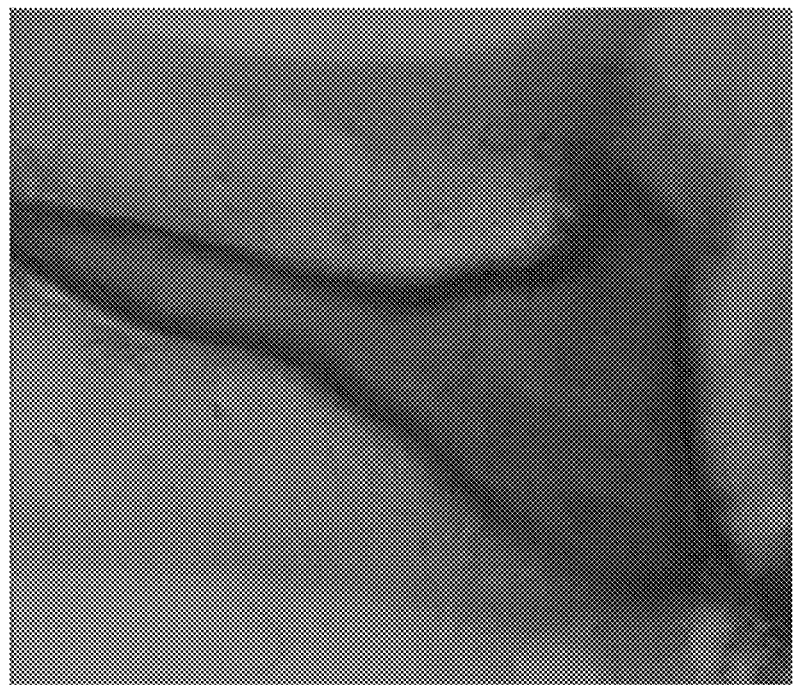

[FIG. 7A]
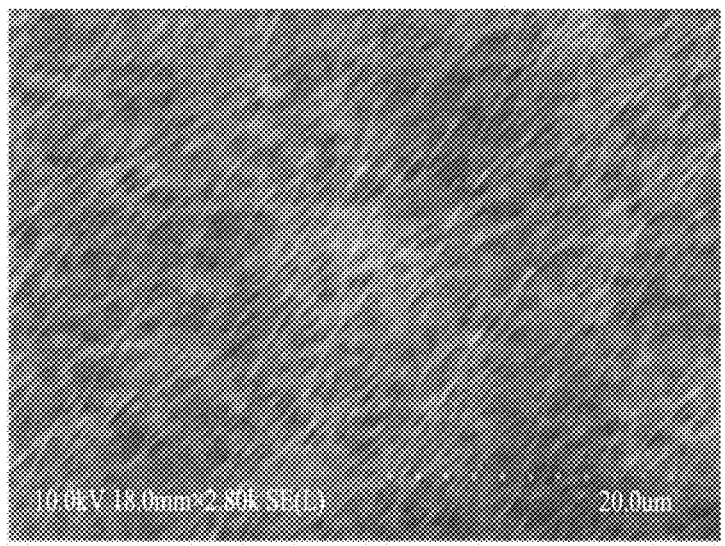
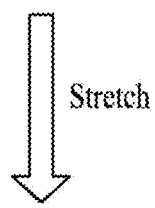
Stretch
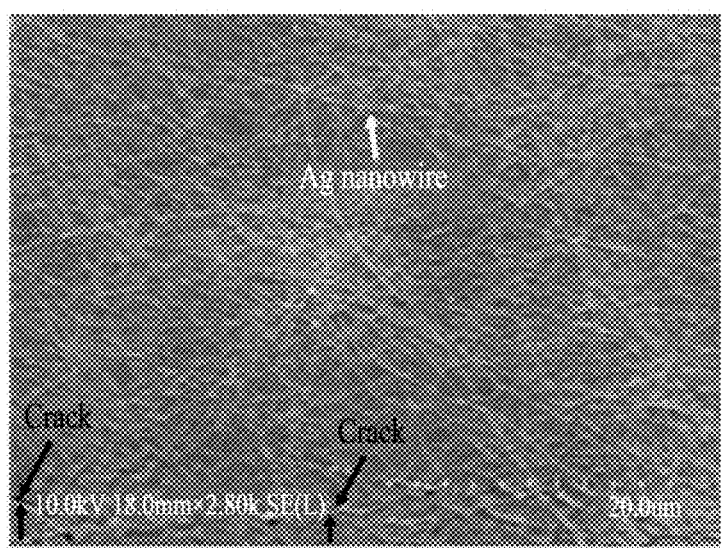

[ FIG. 7B ]
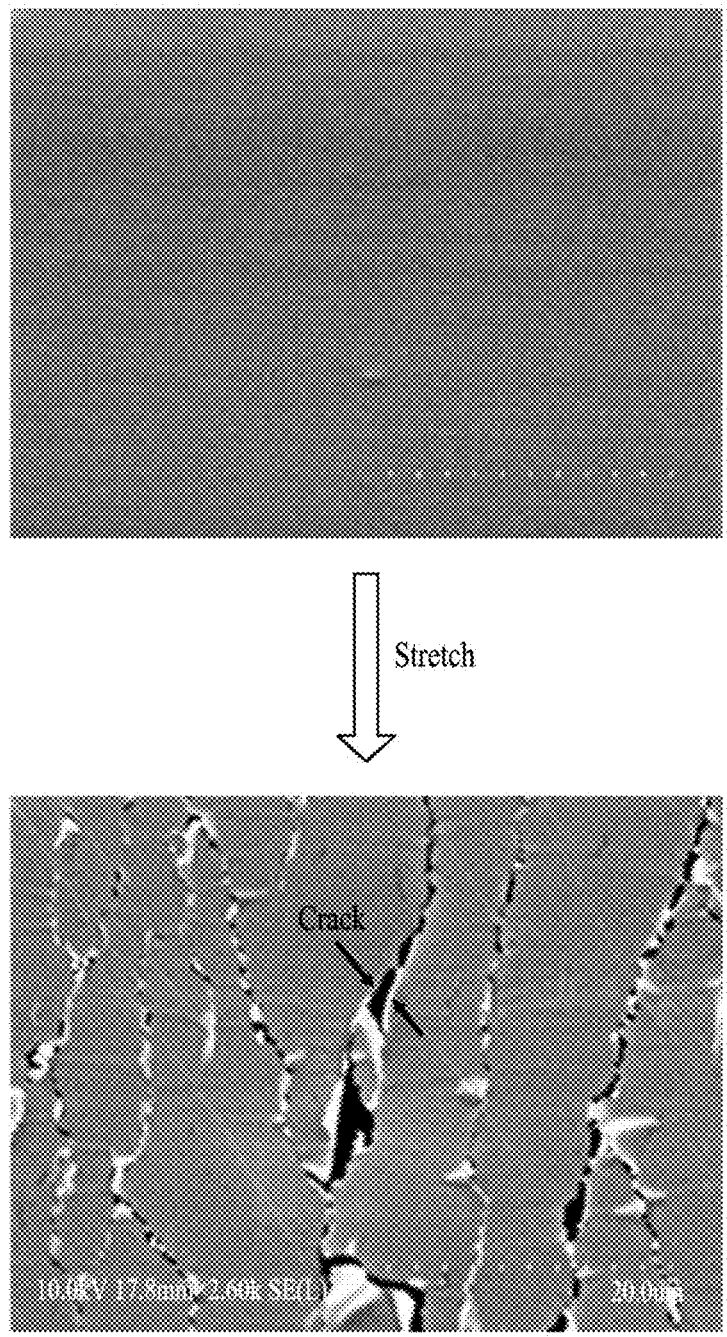

[ FIG. 8A ]
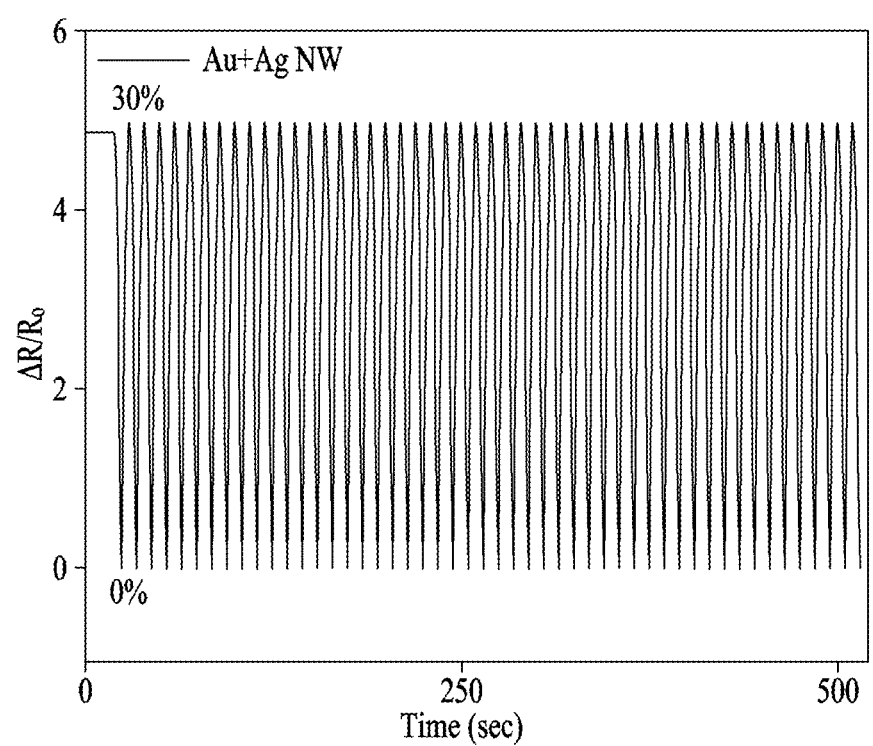

[ FIG. 8B ]
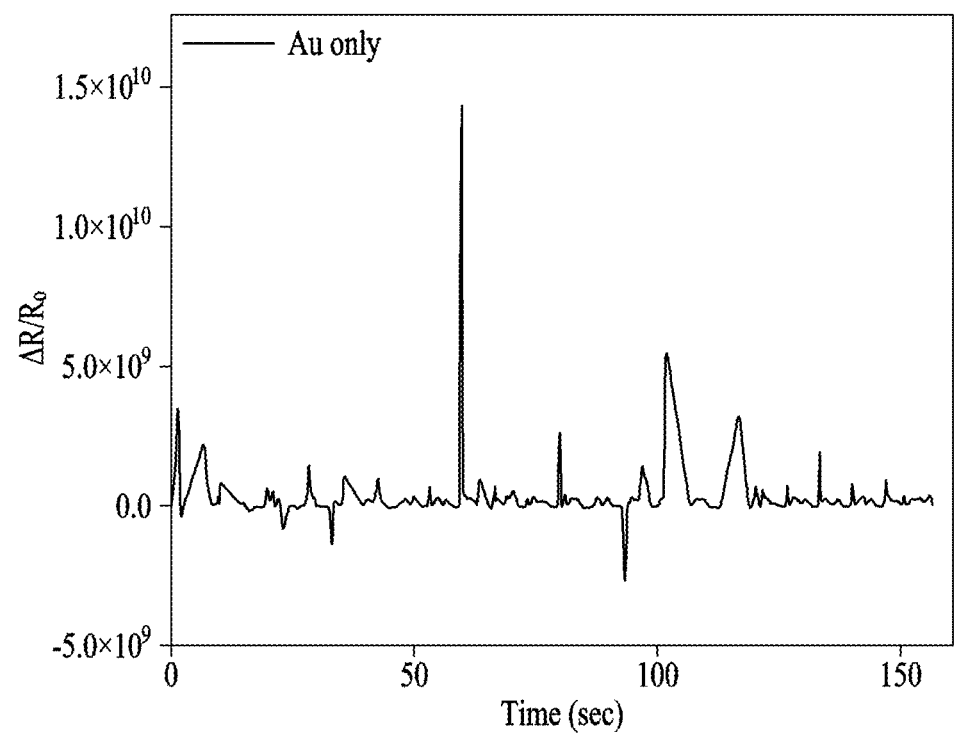

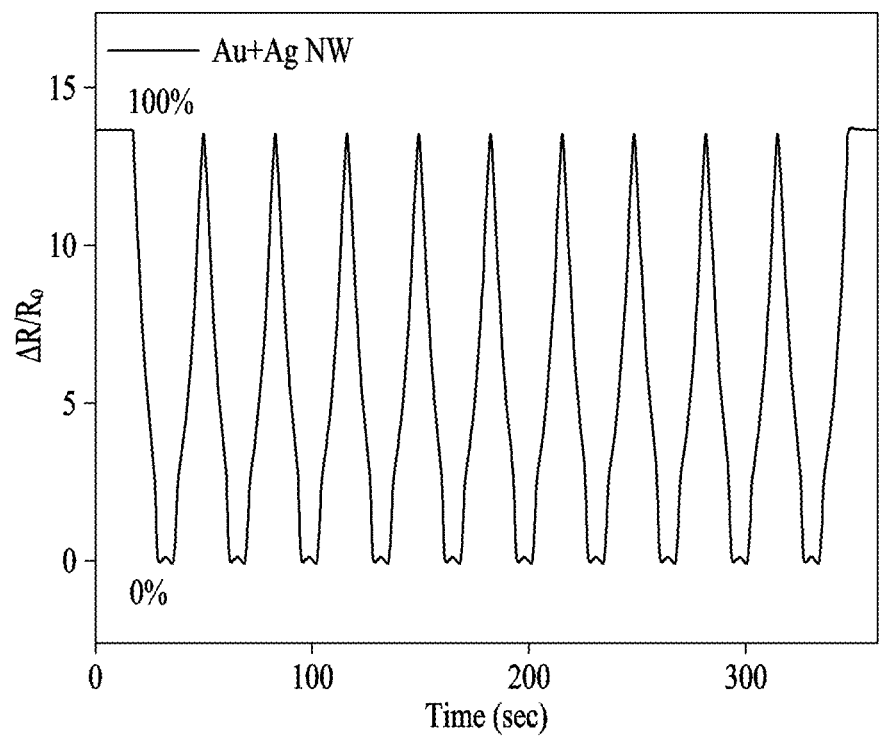
[ FIG. 9 ]

HIGH PERFORMANCE STRETCHABLE ELECTRODE WITH FULL AREA COVERAGE AND METHOD FOR MANUFACTURING THE SAME

CROSS-REFERENCE TO RELATED APPLICATION

This application claims priority to Korean Patent Application No. 10-2020-0132113, filed on Oct. 13, 2020 in the Korean Intellectual Property Office, the disclosure of which is incorporated herein by reference.

BACKGROUND OF THE DISCLOSURE

Field of the Disclosure

The present disclosure relates to a high performance stretchable electrode having a double layer structure with stretchability (that is, flexibility) and high coverage and a method for manufacturing the same.

Description of the Related Art

In recent years, studies on a stretchable electrode having high utility based on different surface adhesive properties are actively proceeding. Representative examples of such stretchable electrodes include an electrode to which a nanowire mesh network is applied, and a metal thin film electrode to which a curved pattern is applied.

The above two electrodes have relatively favorable flexibility but low coverage and, therefore, charge extraction and sensing efficiencies are low which in turn makes application thereof to a variety of applications difficult. Accordingly, a solution to overcome the above problems is required. of Electrode coverage is a factor influencing performance of the electrode and, when the coverage is 100%, the performance becomes higher. This is because the electrode with low coverage may not be efficient in terms of charge extraction and detection.

Applications requiring high electrode coverage are as follows:

In order to apply an electrode to a medical field with a purpose of extracting biosignals such as an electrocardiogram, an electromyogram, etc., the electrode should completely cover the skin, internal organs, etc., however, if the coverage is low, it is difficult to precisely extract biosignals.

For vertical optoelectronic devices such as flexible displays, energy elements, solar cells, etc., as well as memory devices, an area of an active layer in which charge extraction occurs means exactly the performance of electrode. In order to maximize efficiency of the active layer, an electrode with high coverage is necessary.

In the case of a capacitive device such as a touch pad, a pressure sensor, etc., an area of the electrode to which external stimulation is applied may be directly connected to the performance thereof and, therefore, maximum coverage is required to achieve high sensitivity.

In general, a nanowire single layer has high flexibility but low level of charge extraction and sensing efficiency due to a low coverage problem. On the other hand, a metal thin film single layer has high level of charge extraction and sensing efficiency based on high coverage properties, but is not suitable for a stretchable electrode due to a flexibility problem. Accordingly, the above layer is less applicable to a stretchable electrode consisting of separate layers, and it is inevitable to adopt additional processes (curved patterning and use of high concentration wire).

RELATED ART DOCUMENTS

Non-Patent Documents

'A stretchable strain sensor based on a metal nanoparticle thin film for human motion detection', J Lee et al., Nanoscale, 2014, 6, 11932.

'Stretchable gold conductors on elastomeric substrates', Stephanie Perichon Lacour et al., APPLIED PHYSICS LETTERS VOLUME 82, NUMBER 15, 14 Apr. 2003.

SUMMARY OF THE DISCLOSURE

Therefore, the present disclosure has been made in view of the above problems, and it is an object of the present disclosure to provide a stretchable electrode that overcomes the low coverage problem of a metal thin film electrode by formation of a double-layer network, thereby achieving excellent charge extraction and sensing performance and being applicable to a variety of fields.

In accordance with an aspect of the present invention, the above and other objects can be accomplished by the provision of a stretchable electrode, including: a substrate; a silver nanowire (AgNW) thin film layer formed on the substrate; and a gold (Au) thin film layer formed on the AgNW thin film layer.

The Au thin film layer may have a thickness of 50 to 300 nm.

The substrate may include polydimethylsiloxane (PDMS), silicone rubber or hydrogel, and the substrate may contain a hydroxyl group introduced into the surface thereof.

In accordance with another aspect of the present invention, there is provided a method for manufacturing a stretchable electrode, including: preparing a silver nanowire solution; forming a silver nanowire (AgNW) thin film layer on a substrate using the silver nanowire solution; and forming a gold (Au) thin film layer on the AgNW thin film layer.

The AgNW thin film layer may be formed by applying the silver nanowire solution to the substrate through spin-coating.

The substrate may include polydimethylsiloxane (PDMS), silicone rubber or hydrogel, and the substrate may be treated with UV-ozone.

The Au thin film layer may be formed by thermal deposition, and the Au thin film layer may have a thickness of 50 to 300 nm.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 illustrates a structural view of a stretchable electrode according to an embodiment of the present invention;

FIG. 2 is a schematic view illustrating a manufacturing process of a stretchable electrode according to an embodiment of the present invention;

FIGS. 3A and 3B illustrate results of current-voltage (I-V) curve assay to an increase in strain with regard to a Ag nanowire-based stretchable electrode (AgNW+Au) according to an embodiment of the present invention and an Au thin film electrode (with only Au) according to a comparative example;

FIG. 4 illustrates results of current-strain (I-strain) curve measurement at a voltage (V) of 0.5 V with regard to a Ag nanowire-based stretchable electrode (AgNW+Au) according to an embodiment of the present invention and an Au thin film electrode (with only Au) according to a comparative example;

FIG. 5 illustrates results of measuring gauge factors (GF) with regard to a Ag nanowire-based stretchable electrode (AgNW+Au) according to an embodiment of the present invention and an Au thin film electrode (with only Au) according to a comparative example;

FIGS. 6A and 6B illustrate photographic images of a surface of a Ag nanowire-based stretchable electrode (AgNW+Au) according to an embodiment of the present invention and a surface of an electrode into which —OH group is not introduced due to non-treatment with UV-ozone;

FIG. 7A illustrates scanning electron microscopy (SEM) images of electrode surface in relation to stretch strain with regard to a Ag nanowire-based stretchable electrode (AgNW+Au) according to an embodiment of the present example;

FIG. 7B illustrates SEM images of electrode surface in relation to stretch strain with regard to an Au thin film electrode (with only Au) according to a comparative example;

FIGS. 8A and 8B illustrate a stability analysis result in relation to stretch strain with regard to a Ag nanowire-based stretchable electrode (AgNW+Au) according to an embodiment of the present example; and FIG. 9 illustrates a stability analysis result in relation to stretch strain with regard to a Ag nanowire-based stretchable electrode (AgNW+Au) according to an embodiment of the present example.

DETAILED DESCRIPTION OF THE DISCLOSURE

The present disclosure will now be described more fully with reference to the accompanying drawings and contents disclosed in the drawings. However, the present disclosure should not be construed as limited to the exemplary embodiments described herein.

The terms used in the present specification are used to explain a specific exemplary embodiment and not to limit the present inventive concept. Thus, the expression of singularity in the present specification includes the expression of plurality unless clearly specified otherwise in context. It will be further understood that the terms "comprise" and/or "comprising", when used in this specification, specify the presence of stated components, steps, operations, and/or elements, but do not preclude the presence or addition of one or more other components, steps, operations, and/or elements thereof.

It should not be understood that arbitrary aspects or designs disclosed in "embodiments", "examples", "aspects", etc. used in the specification are more satisfactory or advantageous than other aspects or designs.

Although terms used in the specification are selected from terms generally used in related technical fields, other terms may be used according to technical development and/or due to change, practices, priorities of technicians, etc.

Therefore, it should not be understood that terms used below limit the technical spirit of the present invention, and it should be understood that the terms are exemplified to describe embodiments of the present invention.

Also, some of the terms used herein may be arbitrarily chosen by the present applicant. In this case, these terms are defined in detail below. Accordingly, the specific terms used herein should be understood based on the unique meanings thereof and the whole context of the present invention.

Meanwhile, terms such as "first" and "second" are used herein merely to describe a variety of constituent elements, but the constituent elements are not limited by the terms. The terms are used only for the purpose of distinguishing one constituent element from another constituent element.

In addition, when an element such as a layer, a film, a region, and a constituent is referred to as being "on" another element, the element can be directly on another element or an intervening element can be present.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

Meanwhile, in the following description of the present invention, a detailed description of known functions and configurations incorporated herein will be omitted when it may make the subject matter of the present invention unclear. The terms used in the specification are defined in consideration of functions used in the present disclosure, and can be changed according to the intent or conventionally used methods of clients, operators, and users. Accordingly, definitions of the terms should be understood on the basis of the entire description of the present specification.

Hereinafter, embodiments of the present invention are more fully described with reference to the accompanying drawings.

The present invention is proposed to overcome a problem of low flexibility of a metal thin film through a double layer and solving a low coverage problem of an electrode when the present invention is applied to the electrode. In the present specification, the coverage of an electrode refers to an active area of the electrode, more particularly, when a non-activated region of the surface of an electrode converges on zero (0), this means that all charge can be extracted and sensed on the whole surface of the electrode. Further, maximization or improvement of coverage indicates improvement in activated area of the electrode.

FIG. 1 illustrates a structural view of the stretchable electrode according to an embodiment of the present invention.

Referring to FIG. 1, the stretchable electrode 100 according to the present invention may include: a substrate 110; a silver nanowire (AgNW) thin film layer 120; and a gold (Au) thin film layer 130 formed on the AgNW thin film layer 120.

The substrate may comprise polydimethylsiloxane (PDMS), silicone rubber or hydrogel, wherein the silicone rubber may be Eco-Flex.

A thickness of the substrate 110 may be within a range at which reduction of flexibility can be minimized, preferably 1 mm. In order to minimize the reduction of flexibility, the thickness of the substrate is preferably decreased. However, if the thickness is less than a specific value, a phenomenon of broken substrate (that is, "rupture after plastic deformation") may occur when great deformation is applied. Therefore, the thickness of the substrate is preferably 1 mm.

A hydroxyl group may be introduced onto the surface of the substrate 110 and, due to introduction of a hydroxyl functional group (—OH) on the surface of the substrate, surface adhesion to silver nanowire may be increased. Meanwhile, when the surface of the substrate 110 is coated with silver nanowire without introduction of a hydroxyl group, the coated silver nanowire surface may become irregular and performance of the stretchable electrode 100 may be deteriorated.

The AgNW thin film layer 120 includes silver nanowires tangled or overlapping one another, wherein the silver nanowires may be connected to produce a silver nanowire (AgNW) network in a mesh form. The silver nanowire may connect grains of a gold thin film layer through a network structure, so as to increase flexibility.

The silver nanowire thin film layer ("AgNW thin film layer") 120 may have flexibility and such flexibility may be applied and/or controlled by adjusting the thickness and a density of the AgNW thin film layer. Accordingly, the flexibility may be enhanced.

A thickness of the gold thin film layer ("Au thin film layer") 130 may range from 50 to 300 nm and, if it is less than 50 nm, the Au thin film layer may not sufficiently cover the AgNW network and the Au thin film layer may rupture. On the other hand, when the thickness is more than 300 nm, there is a concern for rupture at a top end position of the Au thin film layer 130 far from the AgNW network, thus causing a decrease in efficiency.

The AgNW thin film layer 120 may form a mesh type network structure having a number of empty spaces, therefore, if the spaces are not sufficiently filled with Au on the Au thin film layer 130, a problem of deteriorated performance may occur.

Formation of the Au thin film layer may overcome a coverage problem of the AgNW thin film layer, which has less utility of the electrode surface as compared to the substrate, instead achieving 100% coverage. Therefore, the electrode of the present invention may be useable for 100% charge extraction and sensing on the surface of the electrode as compared to the substrate and, simultaneously, overcome low flexibility of the Au thin film layer, thereby being useable as a stretchable electrode.

Further, a method for manufacturing the stretchable electrode according to an embodiment of the present invention may include: preparing a silver nanowire solution; forming a silver nanowire ("AgNW") thin film layer on a substrate; and forming a gold ("Au") thin film layer on the AgNW thin film layer.

The silver nanowire solution may be prepared by dispersing silver nanowires in a solvent, wherein the solvent may be ethanol while the silver nanowire solution may have a concentration of 0.5 wt. %.

The AgNW thin film layer may be formed by applying the silver nanowire solution to the substrate through spin coating, spray coating, bar coating or drop casting. Specifically, the silver nanowire solution may be applied to the substrate through spin coating at 300 to 3000 rpm for 30 seconds, preferably at 300 to 1000 rpm for 30 seconds.

The substrate may comprise polydimethylsiloxane (PDMS), silicone rubber or hydrogel, wherein the silicone rubber may be Eco-Flex.

The substrate may be subjected to 1,2-ethane-di-thiol or (3-mercaptopropyl)trimethoxysilane (MPTS) treatment in order to introduce a thiol group into the substrate.

The substrate may be surface-treated with UV-ozone, wherein the UV-ozone treatment may be conducted for 30 minutes. If a treatment time exceeds 30 minutes, the substrate may be rigidly deformed.

A thickness of the substrate may be within a range within which reduction of flexibility is minimized, preferably 1 mm. In order to minimize the reduction of flexibility, the thickness of the substrate is preferably decreased. However, if the thickness is less than a specific value, a phenomenon of broken substrate (that is, "rupture after plastic deformation") may occur when great deformation is applied. Therefore, the thickness of the substrate is preferably 1 mm.

The Au thin film layer may be formed by thermal deposition, specifically, the Au thin film layer may be formed through thermal deposition at an atmospheric pressure of $3.0 \times 10^{-6}$ atm or less under a condition of 0.3 Å/s.

The thickness of the Au thin film layer may range from 50 to 300 nm. If the thickness is less than 50 nm, the Au thin film layer may not sufficiently cover the AgNW network and the Au thin film layer may rupture. On the other hand, when the thickness is more than 300 nm, there is a concern of rupture at a top end position of the Au thin film layer far from the AgNW network, thus causing a decrease in efficiency.

The AgNW thin film layer 120 may form a mesh type network structure having a number of vacant spaces, therefore, if the spaces are not sufficiently filled with Au on the Au thin film layer 130, a problem of deteriorated performance may occur.

The AgNW thin film has excellent flexibility but low coverage of about 10%, which in turn causes insufficient performance in terms of use as an electrode.

Meanwhile, in the case of an electrode using a single gold thin film, 100% coverage may be ensured so as to exhibit excellent charge extraction and sensing performance. However, flexibility is substantially not involved. If this electrode is applied to a stretchable element, a great crack in a micrometer-scaled size may occur on the surface of the thin film, and original properties of the thin film cannot be retained, however, the thin film may be ruptured. More specifically, in the case of the existing single gold thin film, when expanded (or elongated) in left and right sides, vertical cracks may occur and, due to this, low flexibility may be observed while having high coverage.

Further, since the AgNW network having a plurality of adhesion points does not involve orientation, a direction of occurring cracks, which is perpendicular to a stretch direction, can be dispersed. Further, it is possible to control occurrence of large cracks due to concentration of deformation on a single site by dispersing deformation applied to the electrode.

Accordingly, the stretchable electrode according to an embodiment of the present invention may be manufactured by forming a gold thin film layer above a silver nanowire thin film layer so that gold thin film grains separated due to cracks occurring on the surface of the gold thin film are connected together by a silver nanowire network, thereby overcoming low flexibility. Further, a problem of high gauge factor indicated as a limitation of the gold thin film having high coverage and low resistance can be solved and, simultaneously, a size of the crack and a direction of crack occurrence by means of the AgNW network having a plurality of adhesion points may be controlled.

Consequently, the stretchable electrode according an embodiment of the present invention adopts a silver nanowire thin film layer and a gold thin film layer, simultaneously, whereby the electrode has a low gauge factor (GF) with a level of about 10; is not broken even by strain of 200% or more; and may achieve stability and recovery through deformation cycle measurement of 0 to 100%.

Hereinafter, the present invention will be described in more detail by way of examples. These examples are provided to more concretely describe the present invention, however, the present invention is not particularly limited by the same.

EXAMPLE

Fabrication of a Stretchable Electrode Based on Silver Nanowire

FIG. 2 is a schematic view illustrating a manufacturing process of the stretchable electrode according to an embodiment of the present invention. Hereinafter, the following examples are described with reference to FIG. 2.

Polydimethylsiloxane (PDMS) with a thickness of 1 nm is used as a substrate. The PDMS substrate was treated with UV-ozone for 30 minutes to introduce hydroxyl groups (—OH) on the surface of the PDMS substrate.

Ag nanowires were dispersed in an ethanol solution to prepare a silver (Ag) nanowire solution with a concentration of 0.5 wt. %, and the Ag nanowire solution was applied to the UV-ozone treated PDMS substrate through spin-coating at 300 to 1000 rpm for 30 seconds, thereby forming a Ag nanowire thin film layer.

On the formed AgNW thin film layer, a gold (Au) thin film layer was formed by thermal evaporation (or deposition) at an atmospheric pressure of $3.0 \times 10^{-6}$ atm or less under a condition of 0.3 Å/s, wherein the Au thin film has a thickness of 50 to 300 nm.

Comparative Example 1

Formation of Au Thin Film Layer

An Au thin film layer was formed on the PDMS substrate through thermal deposition by the same procedures as described in the above example except that a Ag nanowire thin film layer is formed.

Comparative Example 2

Formation of Ag Nanowire Thin Film Layer

A Ag nanowire thin film layer was formed on the PDMS substrate by UV-ozone treatment by the same procedures as described in the above example without introduction of hydroxyl groups (—OH) on the surface of the PDMS substrate, followed by thermal deposition.

Experimental Example 1

Current-Voltage Curve (I-V Curve) Assay

The Ag nanowire-based stretchable electrode (AgNW+Au) according to the above example and the Au thin film electrode (with only Au) were subjected to current-voltage (I-V) curve assay to an increase in strain, and results thereof are shown in FIG. 3. Specifically, FIG. 3A illustrates a result of I-V curve assay for the Ag nanowire-based stretchable electrode according to the present example while FIG. 3B illustrates a result of I-V curve assay for the Au thin film electrode according to Comparative Example 1.

Referring to FIGS. 3A and 3B, as to the Au thin film electrode of Comparative Example 1, the electrode was broken according to increases of strain (0, 10, 20, 30%) and, therefore, current (I) could not be measured (FIG. 3B). On the contrary, the Ag nanowire-based stretchable electrode of the present example was not broken even with increase in strain (0, 10, 20, 30%) respectively (FIG. 3B). Referring to FIG. 3A, it could be confirmed that the Ag nanowire-based stretchable electrode of the present example has stretchable effects and thus enables fabrication of an electrode having full area coverage, which can be utilized as an electrode for diverse stretchable and/or wearable devices.

Experimental Example 2

Current-Strain (I-Strain) Curve

With regard to both the Ag nanowire-based stretchable electrode (AgNW+Au) according to the present example and the Au thin film electrode (with only Au) according to Comparative Example 1, results of current-strain (I-strain) curve measurement at a voltage (V) of 0.5 V are shown in FIG. 4.

Referring to FIG. 4, the Ag nanowire-based stretchable electrode (AgNW+Au) according to the present example shows a linear curve and stable strain reaction could be seen, and it was confirmed that functions of the electrode are stably performed without breakage of the electrode even when the strain is about 30%.

On the contrary, it could be seen that the Au thin film electrode (with only Au) according to Comparative Example 1 is broken with strain of about 10%.

Experimental Example 3

Determination of Gauge Factor (GF)

With regard to both the Ag nanowire-based stretchable electrode (AgNW+Au) according to the present example and the Au thin film electrode (with only Au) according to Comparative Example 1, results of measuring gauge factors (GF) are shown in FIG. 5.

Referring to FIG. 5, it could be seen that the Ag nanowire-based stretchable electrode (AgNW+Au) according to the present example has GF of about 10, while the Au thin film electrode (with only Au) according to Comparative Example 1 has GF of about $10^{10}$.

Experimental Example 4

Surface Observation

With regard to both the Ag nanowire-based stretchable electrode (AgNW+Au) according to the present example and the Ag nanowire thin film electrode according to Comparative Example 2, the surface of each electrode was observed through photographic images and the observed images are shown in FIG. 6.

Specifically, FIG. 6A is photographic images for observation of the surface of the stretchable electrode with introduced —OH group according to the present example, while FIG. 6B is photographic images for observation of the surface of the Ag nanowire-coated electrode without introduction of —OH group according to Comparative Example 2.

Referring to FIG. 6A, it could be confirmed that the electrode with introduced —OH group has a superiorly uniform surface than that of the electrode without introduction of —OH group shown in FIG. 6B.

In the case of the electrode shown in FIG. 6B, the surface becomes irregular due to no introduction of —OH group and, therefore, may affect deterioration of performance of the stretchable electrode.

Experimental Example 5

Surface Observation in Relation to Stretch Strain

FIG. 7A illustrates scanning electron microscopy (SEM) images of electrode surface in relation to stretch strain with regard to the Ag nanowire-based stretchable electrode (AgNW+Au) according to the present example, and FIG. 7B illustrates SEM images of electrode surface in relation to stretch strain with regard to the Au thin film electrode (with only Au) according to Comparative Example 1.

Referring to FIG. 7A, the left shows SEM images of the electrode surface before stretch strain of the Ag nanowire-based stretchable electrode (AgNW+Au) according to the present example, while the right shows SEM images of the electrode surface after stretch strain of the Ag nanowire-based stretchable electrode (AgNW+Au) according to the present example.

Referring to FIG. 7B, the left shows SEM images of the electrode surface before stretch stain of the Au thin film electrode (with only Au) according to Comparative Example 1, while the right shows SEM images of the electrode surface after stretch strain of the Au thin film electrode (with only Au) according to Comparative Example 1.

Further, referring to FIG. 7A, the Ag nanowire-based stretchable electrode (AgNW+Au) according to the present example shows inhibition of crack even with stretch strain. Further, it could be confirmed that Ag nanowires were tangled or overlapped together, and thus, the Ag nanowires were connected to form a mesh type Ag nanowire network structure.

On the contrary, referring to FIG. 7B, it could be seen that the Au thin film electrode (with only Au) according to Comparative Example 1 cracked. Referring to FIG. 7B, a mesh type network structure was not formed due to absence of Ag nanowire thin film layer. Consequently, it is considered that the substrate does not have flexibility, which in turn causes the occurrence of cracks.

Experimental Example 6

Analysis of Stability in Relation to Stretch Strain

With regard to the Ag nanowire-based stretchable electrode ('Au+AgNW') according to the present example and the Au thin film electrode ('with Au only') according to Comparative Example 1, results of analyzing a change in relative resistance ($\Delta R/R_o$) cycle to stretch strain with a strain rate of 0 to 30% are shown in FIGS. 8A and 8B, respectively.

Referring to FIG. 8A, it could be seen that the cycle is stable in a predetermined level over time even with stretch strain of 0 to 30%.

On the contrary, referring to FIG. 8B, it could be seen that the cycle is unstable over time to stretch strain of 0 to 30%.

In addition, with regard to the Ag nanowire-based stretchable electrode ('Au+AgNW') according to the present example, a result of analyzing a change in relative resistance ($\Delta R/R_o$) cycle to stretch strain with a strain rate of 0 to 100% is shown in FIG. 9.

Referring to FIG. 9, it could be seen that the cycle is stable in a predetermined level over time even with stretch strain of 0 to 100%.

In accordance with an aspect of the present disclosure, the present invention may provide a high performance stretchable electrode that has excellent performance based on high coverage, and high conductivity and low gauge factor by selectively adjusting flexibility thereof.

Further, the present invention may provide a high performance stretchable electrode by simple processes of coating and deposition without additional processes.

Meanwhile, embodiments of the present invention disclosed in the present specification and drawings are only provided to help understanding of the present invention and the scope of the present invention is not limited to the embodiments. It will be apparent to those skilled in the art that various modifications can be made to the above-described exemplary embodiments of the present invention without departing from the spirit or scope of the invention.

What is claimed is:

1. A stretchable electrode, comprising:
   a substrate;
   a silver nanowire (AgNW) thin film layer formed on the substrate; and
   a gold (Au) thin film layer formed on the AgNW thin film layer.
2. The stretchable electrode according to claim 1, wherein the Au thin film layer has a thickness of 50 to 300 nm.
3. The stretchable electrode according to claim 1, wherein the substrate comprises polydimethylsiloxane (PDMS), silicone rubber or hydrogel.
4. The stretchable electrode according to claim 1, wherein the substrate contains a hydroxyl group introduced into the surface thereof.
5. A method for manufacturing a stretchable electrode, comprising:
   preparing a silver nanowire solution;
   forming a sliver nanowire (AgNW) thin film layer on a substrate using the silver nanowire solution; and
   forming a gold (Au) thin film layer on the AgNW thin film layer.
6. The method according to claim 5, wherein the AgNW thin film layer is formed by applying the silver nanowire solution to the substrate through spin-coating.
7. The method according to claim 5, wherein the substrate comprises polydimethylsiloxane (PDMS), silicone rubber or hydrogel.
8. The method according to claim 5, wherein the substrate is treated with UV-ozone.
9. The method according to claim 5, wherein the Au thin film layer is formed by thermal deposition.
10. The method according to claim 5, wherein the Au thin film layer has a thickness of 50 to 300 nm.

* * * * *